INVENTOR.
Harry T. Jensen
BY
Shenier & O'Connor
ATTORNEYS

INVENTOR.
Harry T. Jensen
BY
Shenier & O'Connor
ATTORNEYS

United States Patent Office 3,547,555
Patented Dec. 15, 1970

3,547,555
ROTOR BLADE PRESSURE SENSING SYSTEM
Harry T. Jensen, Milford, Conn., assignor to United Aircraft Corporation, East Hartford, Conn., a corporation of Delaware
Filed Mar. 5, 1969, Ser. No. 804,448
Int. Cl. B64c 27/32
U.S. Cl. 416—61    9 Claims

ABSTRACT OF THE DISCLOSURE

A pressure sensing system for helicopter rotor blades comprises a plurality of spar pressure transducers which are each connected to the secondary winding of a rotary transformer positioned at the lower end of the rotor drive shaft. Loss in spar pressure of any rotor blade changes the loading of the secondary winding; and the resultant change in impedance reflected into the primary winding is used to actuate appropriate cockpit signalling devices indicating to the pilot the existence of a potential hazard.

BACKGROUND OF THE INVENTION

My invention is an improvement over the co-pending application for Fluid Pressure Variation Sensor and Indicator, Ser. No. 640,237, filed May 22, 1967, which shows a visual pressure sensor for each rotor blade which may be inspected on the ground with the rotor blades stationary.

SUMMARY OF THE INVENTION

One object of my invention is to provide a rotor blade pressure sensing system in which the indications of spar pressure transducers mounted on the rotor are transmitted to the cockpit to operate signalling devices within view of the pilot.

A further object of my invention is to provide a spar pressure sensing system which gives in-flight warning to the pilot of an unsafe rotor condition, so that the helicopter may be landed at the earliest practicable opportunity.

Other and further objects of my invention will appear from the following description.

DESCRIPTION OF THE DRAWINGS

In the accompanying drawings which form part of the instant specification and are to be read in conjunction therewith and in which like reference numerals are used to indicate like parts in the various views.

DESCRIPTION OF THE PREFERRED EMBODIMENT

Figure 1:
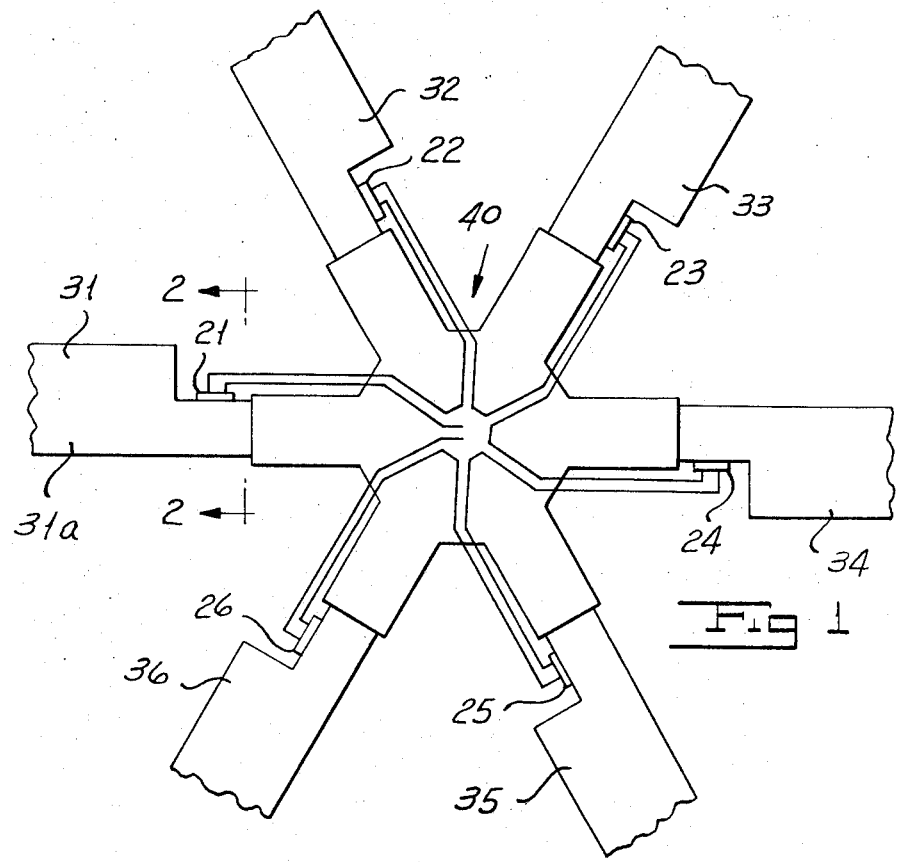
FIG. 1 is a fragmentary plan view showing the spar pressure transducers of a six-bladed rotor.

Referring now more particularly to FIG. 1 of the drawings, a helicopter rotor indicated generally by the reference numeral 40 is provided with six blades 31 through 36, each of which is provided with corresponding spar pressure transducers 21 through 26.

Figure 2:
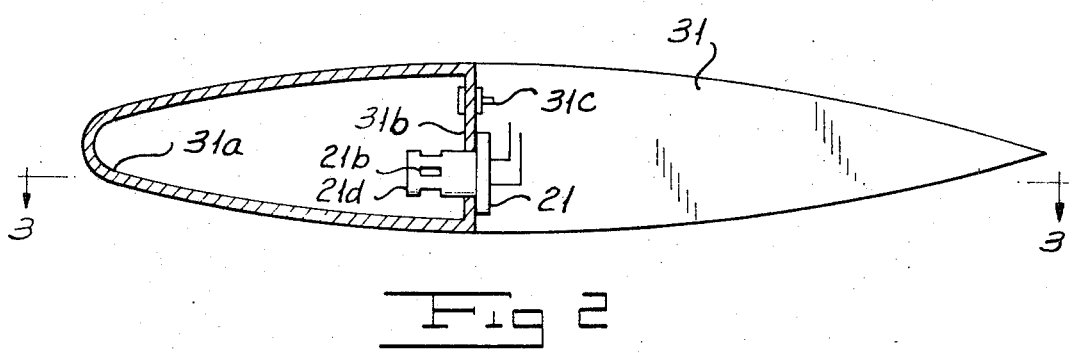
FIG. 2 is a sectional view of one rotor blade on an enlarged scale taken along line 2—2 of FIG. 1.

As may be seen by reference to FIG. 2, each of the rotor blades, such as blade 31, comprises a D-spar having a curved leading edge wall 31a and a flat vertical mid-chord wall 31b. Mounted in the flat mid-chord wall 31b are a spar pressure transducer 21 and a pneumatic check valve 31c. The spar is fluid-tight and is pressurized through valve 31c to two atmospheres, for example, with a gas which may conveniently be air.

Figure 3:
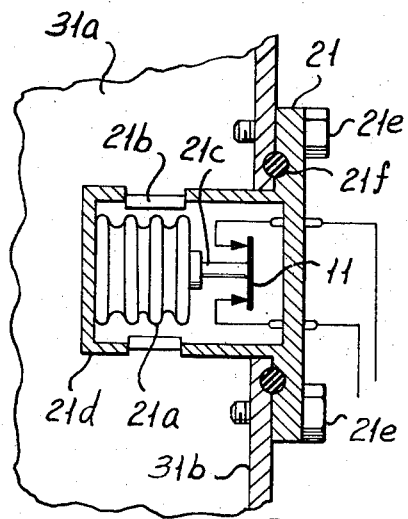
FIG. 3 is a sectional view of a preferred spar pressure transducer on an enlarged scale taken along the line 3—3 of FIG. 2.

As may be seen by reference to FIG. 3, spar pressure transducer 21 comprises a sylphon bellows which is preferably filled with the same gas at the same pressure as that used in pressurizing the spar, so that temperature variations produce equal changes in the pressures within the spar and within the bellows. One end of bellows 21a is secured to the end of a cylindrical housing 21d which is provided with a plurality of apertures 21b through which spar pressure fluctuations are communicated to the bellows 21a. The armature of a switch 11 is secured to the free end of bellows 21a by an insulating member 21c. With the spar pressure equal to the pressure within the bellows, no net forces are exerted; and the bellows is in the position shown where switch 11 is closed. If a fatigue crack develops in the spar, the spar pressure will be lost. A net pressure of approximately one atmosphere will be exerted by the gas inside the bellows; and it will expand, thus opening switch 11. The contacts of switch 11 are connected to external conductors through hermetically sealed leads. The spar pressure transducer may be secured to wall 31b by bolts 21e; and a hermetic seal is assured by the provision of an elastomeric O-ring 21f.

Figure 4:
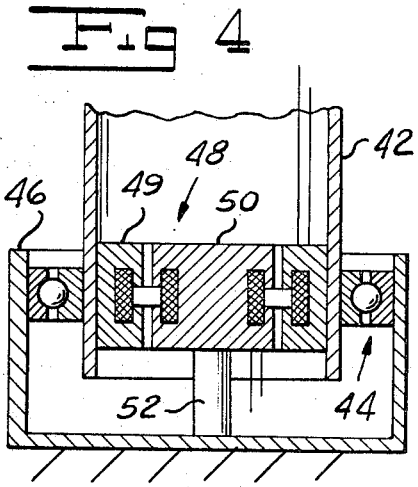
FIG. 4 is a sectional elevation showing the rotary transformer positioned at the lower end of the rotor drive shaft.
Figure 5:
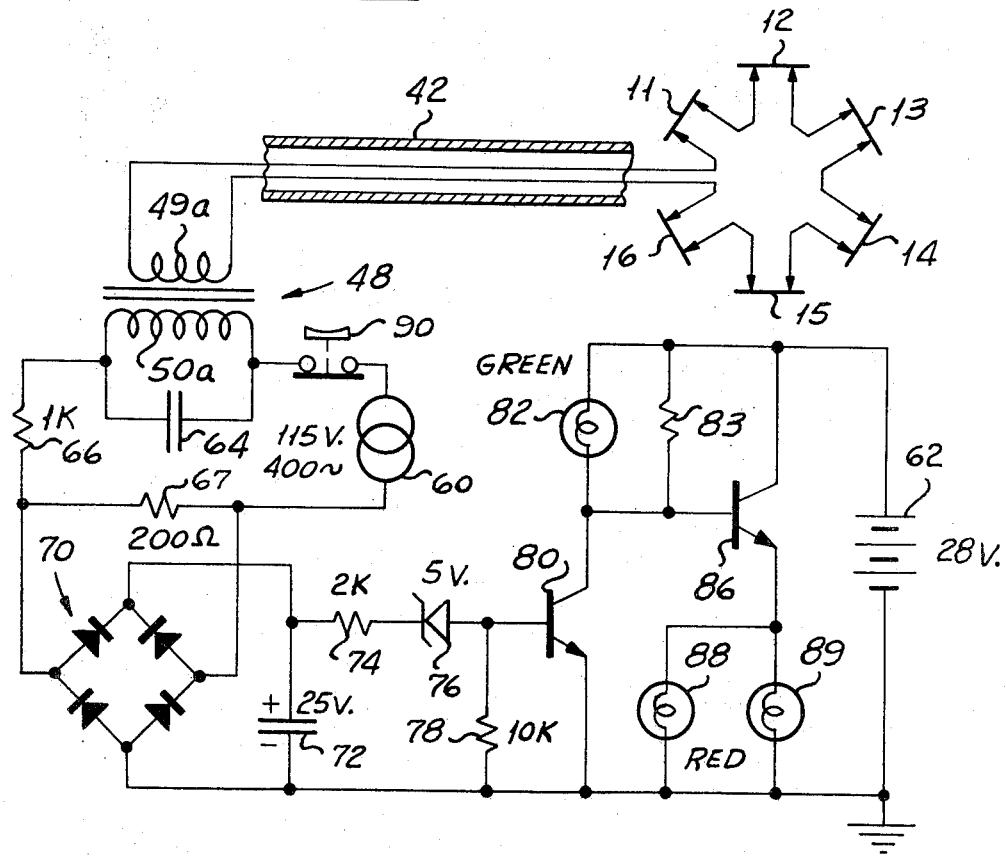
FIG. 5 is a schematic view showing a preferred circuit for providing cockpit warning signals.

As may be seen by reference to FIGS. 1, 4 and 5, the switches 11 through 16 of spar pressure transducers 21 through 26 are serially connected adjacent the center of rotor 40 at the upper end of the rotor shaft 42. Switches 11 through 16 are then connected through a pair of conductors extending inside shaft 42 to the rotor winding 49a of a rotary transformer indicated generally by the reference numeral 48 which is positioned at the lower end of shaft 42. Transformer 48 comprises a rotor 49 which is secured to shaft 42 and a stator 50 which is secured by a stub shaft 52 to the air frame 46. The lower end of shaft 42 is rotatably secured to air frame 46 by a bearing indicated generally by the reference numeral 44. Stator winding 50a is connected in series with a 1K resistor 66 and a 200 ohm resistor 67 across a 115 volt alternating current source 60 of 400 cycles per second. Stator winding 50a is shunted by capacitor 64 such that the parallel L–C combination exhibits anti-resonance at the excitation frequency. The voltage output across resistor 67 is connected to the input of a full-wave bridge rectifier circuit indicated generally by the reference numeral 70. The output of rectifying circuit 70 is connected across a 25 volt capacitor 72, the negative terminal of which is grounded. The positive terminal of capacitor 72 is serially connected through a 2K resistor 74 and a 5 volt Zener diode 76 to the base of an n-p-n transistor 80, the emitter of which is grounded. The base of transistor 80 is connected to ground through a 10K resistor 78. The negative terminal of a 28 volt direct current source 62 is grounded; and the positive terminal thereof is connected through a resistor 83 to the collector of transistor 80. Resistor 83 is shunted by a green indicator lamp 82. The collector of transistor 80 is connected to the base of an n-p-n emitter follower transistor 86, the collector of which is coupled to the positive terminal of source 62. The emitter of transistor 86 is coupled to ground through parallel connected red indicator lamps 88 and 89.

In operation of my invention, switches 11 through 16 are closed as long as pressure is maintained within the spars of each of the rotor blades. Rotor winding 49a is thus short-circuited and reflects a very low impedance into stator winding 50a. Substantially the full potential of source 60 appears across voltage dividing resistors 66 and 67. The voltage across resistor 67 is substantially one-sixth that of source 60; and the rectified output voltage of bridge 70 across capacitor 72 is substantially 25 volts. This is five times the voltage delay provided by Zener diode 76. Transistor 80 is rendered conductive, being provided with a base current of substantially 10 ma. The green indicator lamp 82 is illuminated, since it sustains substantially 28 volts; and the red indicator lamps are extinguished since they sustain substantially no voltage.

Upon a loss of spar pressure in any of the rotor blades, one of switches 11 through 16 will open, thereby open-circuiting rotor winding 49a. The parellel resonant impedance of stator winding 50a and capacitor 64 is extremely high and may exceed 30K or twenty-five times the 1.2K value of resistors 66 and 67 in series. The output of bridge rectifier 70 across capacitor 72 will thus drop to less than 1 volt which is only one-fifth the voltage delay provided by Zener diode 76. Accordingly, no base current flows to transistor 80, and it is substantially non-conductive. Both the base and the emitter of emitter follower transistor 86 rise to a high potential, extinguishing green indicator lamp 82 and illuminating red indicator lamps 88 and 89.

It will be noted that my system has been instrumented for fail-safe operation. In the event of an open circuit in any of switches 11 through 16 or in any of the connections, or of a breakdown in rotary transformer 48 or bridge rectifier 70, or of a failure in alternating current supply 60, transistor 80 is rendered non-conductive; and green lamp 82 is extinguished, while red lamps 88 and 89 are illuminated.

Furthermore, the use of a rotary transformer insures high reliability, since it is entirely shielded from electromagnetic radiation by virtue of its mounting internally of shaft 42 and since there is no noise or frictional wear as would be occasioned by the use of slip rings and brushes.

Figure 6:
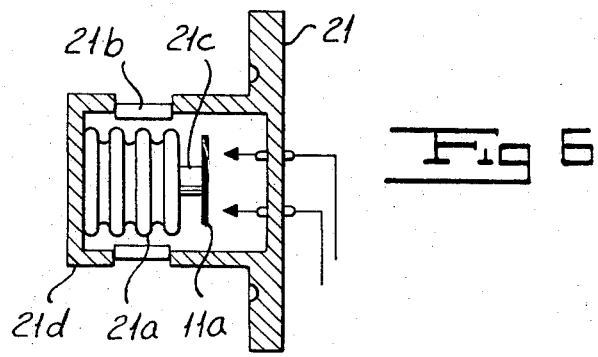
FIG. 6 is a sectional view of an alternate spar pressure transducer.

Referring now to FIG. 6, there is shown an alternate transducer wherein switch 11a is open when the spar pressure is equal to the pressure within the bellows. Upon loss of spar pressure, the bellows expands, thus closing switch 11a.

Figure 7:
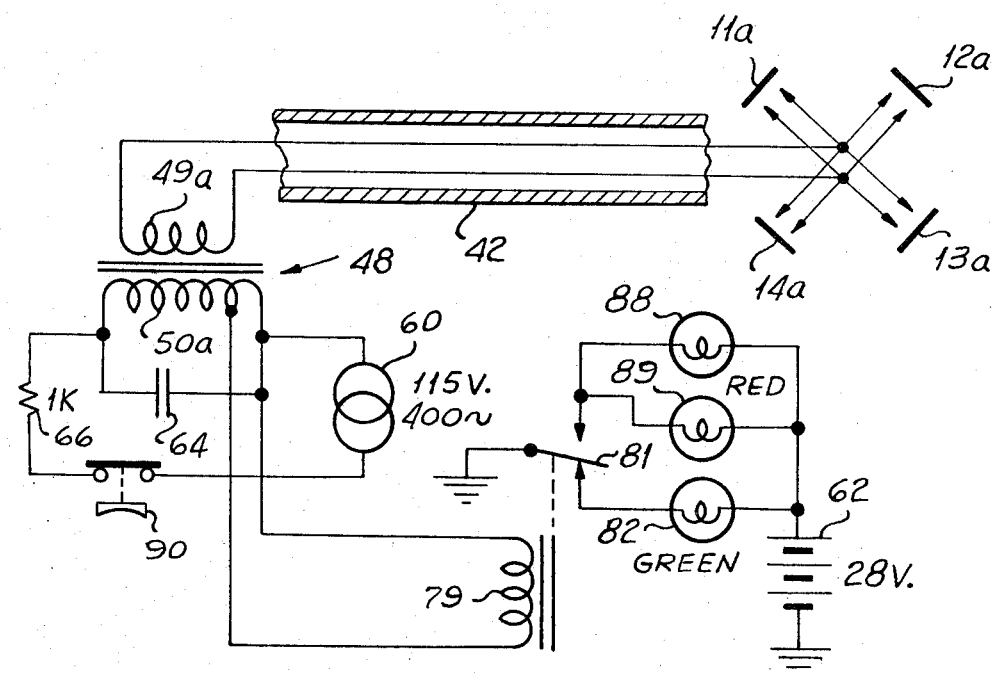
FIG. 7 is a schematic view showing an alternate circuit for providing cockpit warning signals.

Referring now to FIG. 7, a four-bladed rotor is provided with corresponding spar pressure transducers of the type shown in FIG. 6 and having normally open switches 11a, 11b, 11c, and 11d. The four switches are connected in parallel adjacent the center of the rotor at the upper end of rotor shaft 42. Switches 11a through 14a are then connected through a pair of conductors extending inside shaft 42 to the rotor winding 49a of transformer 48 at the lower end of shaft 42. Stator winding 50a is connected in series with 1K resistor 66 across alternating current source 60. Resonating capacitor 64 shunts stator winding 50a. A tapped portion of the stator winding is applied to a relay winding 79 which actuates a single-pole, double-throw switch 81. The armature of switch 81 is grounded. One contact of switch 81 is connected through green indicator lamp 82 to the positive terminal of battery 62. The other contact of switch 81 is coupled through parellel-connected red indicator lamps 88 and 89 to the positive terminal of battery 62, the negative terminal of which is grounded.

In operation of the circuit of FIG. 7, switches 11a through 14a are open as long as pressure exists within each of the rotor blade spars. Rotor winding 49a is thus open-circuited. Substantially the full potential of source 60 appears across the resonant stator winding 50a. Relay winding 79 is energized, drawing the armature of switch 81 into the position shown, where green lamp 82 is illuminated.

Upon a loss of pressure in any of the spars, one of switches 11a through 14a will close, thereby short-circuiting rotor winding 49a. A very low impedance is reflected into stator winding 50a; and its voltage drops substantially to zero. Relay winding 79 is disabled. The armature of switch 81 moves to its alternate position, extinguishing the green lamp and illuminating red indicator lamps 88 and 89.

The circuit of FIG. 7 operates in a fail-safe manner for an open-circuit in winding 50a, for a short-circuit in either of windings 49a and 50a, and for a failure of supply 60, since relay winding 79 is disabled. However, for an open circuit in winding 49a or in the connections to the switches 11a through 14a, the operation is not fail-safe; and hence the circuit of FIG. 5 is preferred.

In each of FIGS. 5 and 7, a normally closed, spring-loaded, press-to-test switch 90 is connected in series with alternating current source 60. Upon manual depression of switch 90 against its loading spring, the A.C. supply is interrupted. The green lamp will be extinguished; and the red lamps will be illuminated. The pilot may thus test the circuit for proper operation. Upon release of switch 90, it returns to the normally closed position shown. This restores the A.C. supply; and the red lamps will be extinguished, while the green lamp will be illuminated.

It will be seen that I have accomplished the objects of my invention. My rotor blade pressure sensing system provides the pilot with an immediate in-flight cockpit indication of loss of spar pressure in any one of a plurality of rotor blades. My system provides highly reliable yet fail-safe operation.

It will be understood that certain features and sub-combinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A pressure sensing system for an aircraft having a cockpit including in combination a rotor provided with a plurality of airfoils, each airfoil comprising a pressurized spar, means comprising a corresponding plurality of transducers for sensing the pressures within each of the spars, a shaft, means mounting the rotor on the shaft, a rotary transformer having a pair of windings, means mounting the transformer on the shaft, means connecting each of the transducers to one winding, and means including the other winding for providing a cockpit indication of loss of pressurization in any of the spars.

2. A system as in claim 1 wherein each transducer comprises a bellows pressurized to the same extent as its corresponding spar.

3. A system as in claim 1 wherein each transducer comprises a switch which is closed when its corresponding spar is pressurized and wherein the transducers are serially connected across said one winding.

4. A system as in claim 3 wherein the indication means comprises an alternating current voltage source, an impedance, means serially connecting said other winding and the impedance across the source, and means for sensing the voltage across the impedance.

5. A system as in claim 1 which further includes a capacitor shunting one of the windings and producing parallel resonance at a predetermined frequency.

6. A system as in claim 1 wherein each transducer comprises a switch which is open when its corresponding spar is pressurized and wherein the transducers are connected in parallel across said one winding.

7. A system as in claim 6 wherein the indication means comprises an alternating current voltage source, as impedance, means serially connecting said other winding and the impedance across the source, and means for sensing the voltage across said other winding.

8. A system as in claim 1 wherein said other winding provides a variable impedance and wherein the indication means comprises an alternating current voltage source, an auxiliary impedance, means serially connecting said other winding and the auxiliary impedance across the source, and means for sensing the voltage across one of the impedances.

9. A system as in claim 1 wherein the rotor and the transformer are mounted at opposite ends of the shaft.

References Cited

UNITED STATES PATENTS

| 2,485,245 | 10/1949 | Schoenbaum | 416—61 |
| 3,134,445 | 5/1964 | Hotchkill | 416—61 |
| 3,417,727 | 12/1968 | Nemes | 416—61(X) |

EVERETTE A. POWELL, Jr., Primary Examiner